United States Patent
Lawless et al.

(10) Patent No.: US 12,515,764 B2
(45) Date of Patent: Jan. 6, 2026

(54) CASSETTE ASSEMBLY, WATERBORNE VESSEL AND METHOD OF SERVICING A WATER-ACCESSIBLE STRUCTURE

(71) Applicant: BMT LIMITED, London (GB)

(72) Inventors: Jago William Lawless, London (GB); Samuel George Alan Stevens, London (GB); Christopher John Witty, London (GB)

(73) Assignee: BMT LIMITED, London (GB)

( * ) Notice: Subject to any disclaimer, the term of this patent is extended or adjusted under 35 U.S.C. 154(b) by 689 days.

(21) Appl. No.: 17/799,195

(22) PCT Filed: Feb. 3, 2021

(86) PCT No.: PCT/GB2021/050231
§ 371 (c)(1),
(2) Date: Aug. 11, 2022

(87) PCT Pub. No.: WO2021/160991
PCT Pub. Date: Aug. 19, 2021

(65) Prior Publication Data
US 2023/0075144 A1    Mar. 9, 2023

(30) Foreign Application Priority Data

Feb. 12, 2020    (GB) .................................... 2001923

(51) Int. Cl.
*B63B 59/02*    (2006.01)
*B63B 27/14*    (2006.01)
*F03D 80/50*    (2016.01)

(52) U.S. Cl.
CPC .............. *B63B 27/14* (2013.01); *B63B 59/02* (2013.01); *F03D 80/50* (2016.05); *B63B 2027/141* (2013.01)

(58) Field of Classification Search
CPC ... B63B 27/14; B63B 59/02; B63B 2027/141; F03D 80/50; Y02E 10/727
See application file for complete search history.

(56) References Cited

FOREIGN PATENT DOCUMENTS

| EP | 2923941 A1 | * | 9/2015 | ............. B63B 59/02 |
| GB | 2476858 A | * | 7/2011 | ............. B63B 21/00 |
| GB | 2 490 252 | | 10/2012 | |
| JP | 2002194729 A | * | 7/2002 | |

OTHER PUBLICATIONS

Search Report for GB Application No. 2001923.8 dated Jul. 23, 2020, 3 pages.
International Search Report and Written Opinion of the ISA for PCT/GB2021/050231 dated May 11, 2021, 12 pages.

* cited by examiner

*Primary Examiner* — Anthony D Wiest
(74) *Attorney, Agent, or Firm* — Nixon & Vanderhye P.C.

(57) ABSTRACT

A cassette assembly is disclosed attachable to an end portion of a waterborne vessel and including a cassette section to bear against an external structure in use. The cassette section is movable relative to the vessel in a direction towards an opposite end of the vessel. A resilient buffer system counters movement of the cassette section when the vessel is moved towards the external structure, wherein the resilient buffer system includes a buffer including a plurality of resiliently compressible elements arranged in series. A waterborne vessel includes a receiving portion for receiving the cassette assembly, and can be used to service a water-accessible structure such as a wind turbine.

15 Claims, 12 Drawing Sheets

CASSETTE ASSEMBLY, WATERBORNE VESSEL AND METHOD OF SERVICING A WATER-ACCESSIBLE STRUCTURE

CROSS REFERENCE TO RELATED APPLICATIONS

The present application is a National Phase of International Application Number PCT/GB2021/050231 filed Feb. 3, 2021, which designated the U.S. and claims priority benefits from Great Britain Patent Application Number GB 2001923.8, filed Feb. 12, 2020, the entire contents of each of which are hereby incorporated by reference.

FIELD

The present disclosure relates to a cassette assembly for a waterborne vessel, a waterborne vessel to support a cassette assembly, and a method of servicing a water-accessible structure, such as a wind turbine.

BACKGROUND

Various challenges arise in servicing water-accessible structures such as offshore wind turbines with waterborne vessels. One difficulty is that of allowing personnel access to the structure. In one example, the vessel may be deliberately navigated into the water-accessible structure, bringing the vessel into contact with the structure and allowing access thereto. However, a significant impact force can be imparted to the structure and/or the vessel, potentially damaging the structure and/or vessel.

UK Patent Publication No. GB 2490252 A discloses a waterborne vessel with a carriage 15 assembly at one end of the vessel. The carriage assembly is movable relative to the vessel and buffered such that, when the carriage assembly impacts the water-accessible structure, the impact force is absorbed. In order to safely use such a system without damaging either the vessel or the structure, constraints are placed on the operation thereof. This may include limiting the mass of the vessel incorporating the carriage assembly, the impact velocity and the 20 angle of impact of the vessel to the structure.

It is an aim of the invention to address these difficulties, and any other difficulties that would be apparent to the skilled reader from the disclosure herein.

SUMMARY

According to the present invention there is provided an apparatus and method as set forth in the appended claims. Other features of the invention will be apparent from the dependent claims, and the description which follows.

According to a first aspect of the disclosure there is provided a cassette assembly attachable to an end portion of a waterborne vessel, the cassette assembly comprising:
- a cassette section to bear against an external structure in use, the cassette section movable relative to the vessel in a direction towards an opposite end of the vessel; and
- a resilient buffer system to counter movement of the cassette section when the vessel is moved towards the external structure,
- wherein the resilient buffer system comprises a buffer comprising a plurality of resiliently compressible elements arranged in series.

The cassette section may be rotatable, suitably in a horizontal plane.

The cassette section may comprise a walkway formed on an upper surface thereof.

The resilient buffer system may comprise at least two buffers spaced apart across a width of the cassette section. Each buffer of the resilient buffer system may comprise a plurality of resiliently compressible elements arranged in series.

The cassette section may comprise a fender section configured to contact the external structure. The fender section may be formed of a resilient material. The fender section may comprise a central protrusion, and a pair of recesses positioned at respective transverse sides of the central protrusion. The recesses may comprise a stop surface, to prevent outboard motion of a first support tube of the external structure beyond the stop surface. The recesses and central protrusion may be configured so that contact between the first support tube and the stop surface causes rotation of the cassette section such that the fender section, suitably the central protrusion, contacts a second support tube of the external structure.

The external structure may be an offshore wind turbine. The external structure may be an offshore platform or other fixed structure or floating structure.

The resiliently compressible elements may be tubular. The compressible elements may comprise cell fenders. Each compressible element may have a longitudinal length of from 250 mm to 1000 mm, suitably from 450 mm to 800 mm, suitably approximately 500 mm. The diameter of the tubular portion of the compressible element may be from 250 mm to 1000 mm, suitably from 450 mm to 800 mm, suitably approximately 550 mm. The compressible element may have a maximum compression of over 20%, suitably over 30%, suitably over 40%, suitably over 50%, most suitably approximately 52.5%. Compression of the compressible element may require 19-50 kNm energy, suitably 20-40 kNm, suitably 22-30 kNm, suitably 23-28 kNm, suitably approximately 26 kNm. Compression of the compressible element may provide a reaction force of approximately 90-235 kN, suitably 100-180 kN, suitably 110-140 kN, suitably approximately 120 kN.

The resilient buffer system may comprise a vertical guide to restrict vertical movement of the buffer, suitably to prevent vertical movement of the buffer. The vertical guide may comprise one or more guide projections formed on one of the buffer or a guide channel of the cassette section, configured to cooperate with a slot formed on the other of the buffer or the guide channel. The projection may project radially from the buffer. The projection may be disposed between neighbouring compressible elements.

The resilient buffer system may comprise a transverse guide to limit a range of transverse movement of the buffer. The transverse guide may comprise first contact elements formed on transverse edges of the buffer, the first contact elements configured to contact second contact elements formed on transverse edges of the guide channel. The guide channel may be sized to permit a predetermined range of transverse motion of the buffer.

Each buffer may comprise three compressible elements arranged in series. Each buffer may comprise 4, 5, 6 or more compressible elements arranged in series.

The resilient buffer system may comprise stop elements configured to limit the motion of the cassette section towards the opposite end of the vessel. The stop elements may be formed of a resiliently deformable material. The cassette section may be configured to contact the stop elements before the buffers reach a maximum compression limit.

The cassette assembly may include an over rotation prevention unit, configured to prevent excessive rotation of the cassette section. The over rotation prevention unit may comprise a plurality of restraining ties, configured to prevent motion of the cassette section stretching the buffers beyond an uncompressed position.

According to a second aspect of the disclosure there is provided a waterborne vessel comprising a receiving portion, the receiving portion configured to receive a cassette assembly as defined herein.

The receiving portion may be configured to slidably support the cassette assembly. The receiving portion may rotatably support the cassette assembly.

The receiving portion may comprise a recess in the vessel, suitably in a front portion of the vessel. The receiving portion may comprise a rear wall. The rear wall may comprise at least two mounting posts to support the at least two buffers. The receiving portion may comprise substantially vertical side walls.

The receiving portion may extend across at least 50% of the width of a forward portion of the vessel. Suitably, the receiving portion may extend across at least 60% of the width of a forward portion of the vessel. The receiving portion may extend across at least 70% of the width of a forward portion of the vessel.

The waterborne vessel may comprise a cassette assembly disposed in the receiving portion.

Further suitable features of the vessel of the second aspect are defined hereinabove in relation to the cassette assembly of the first aspect, and may be combined in any combination.

According to a third aspect of the disclosure there is provided a method of servicing a water-accessible structure using a waterborne vessel, the waterborne vessel comprising a cassette assembly arranged at an end portion of the waterborne vessel, the method comprising:
  bringing a cassette section of the cassette assembly into contact with the water accessible structure, and
  countering relative movement of the cassette section in a direction towards an opposite end of the vessel using a resilient buffer system,
  wherein the resilient buffer system comprises a buffer comprising a plurality of resiliently compressible elements arranged in series.

The water-accessible structure may be a wind turbine.

Further suitable features of the method of the second aspect are defined hereinabove in relation to the cassette assembly of the first aspect and vessel of the second aspect, and may be combined in any combination.

According to a fourth aspect of the disclosure there is provided use of a cassette assembly and/or waterborne vessel as defined herein.

According to a fifth aspect of the disclosure there is provided a cassette assembly attachable to an end portion of a waterborne vessel, the cassette assembly comprising:
  a cassette section to bear against an external structure in use, the cassette section movable relative to the vessel in a direction towards an opposite end of the vessel; and
  a resilient buffer system to counter movement of the cassette section when the vessel is moved towards the external structure,
  wherein the cassette section comprises a fender section configured to contact the external structure, the fender section comprising:
    a central protrusion; and
    a pair of recesses positioned at respective transverse sides of the central protrusion.

The recesses may comprise a stop surface, to prevent outboard motion of a first support tube of the external structure beyond the stop surface. The recesses and central protrusion may be configured so that contact between the first support tube and the stop surface causes rotation of the cassette section such that the fender section, suitably the central protrusion, contacts a second support tube of the external structure.

Further suitable features of the assembly of the fifth aspect are defined hereinabove in relation to the cassette assembly of the first aspect and vessel of the second aspect and may be combined in any combination.

According to a sixth aspect of the disclosure there is provided a cassette assembly attachable to an end portion of a waterborne vessel, the cassette assembly comprising:
  a cassette section to bear against an external structure in use, the cassette section movable relative to the vessel in a direction towards an opposite end of the vessel; and
  a resilient buffer system to counter movement of the cassette section when the vessel is moved towards the external structure,
  wherein the resilient buffer system comprises an over rotation prevention unit configured to prevent excessive rotation of the cassette section.

Further suitable features of the assembly of the sixth aspect are defined hereinabove in relation to the cassette assembly of the first aspect and vessel of the second aspect and may be combined in any combination.

BRIEF DESCRIPTION OF DRAWINGS

For a better understanding of the disclosure, and to show how examples of the same may be carried into effect, reference will now be made, by way of example only, to the accompanying diagrammatic drawings in which.

Figure 1:
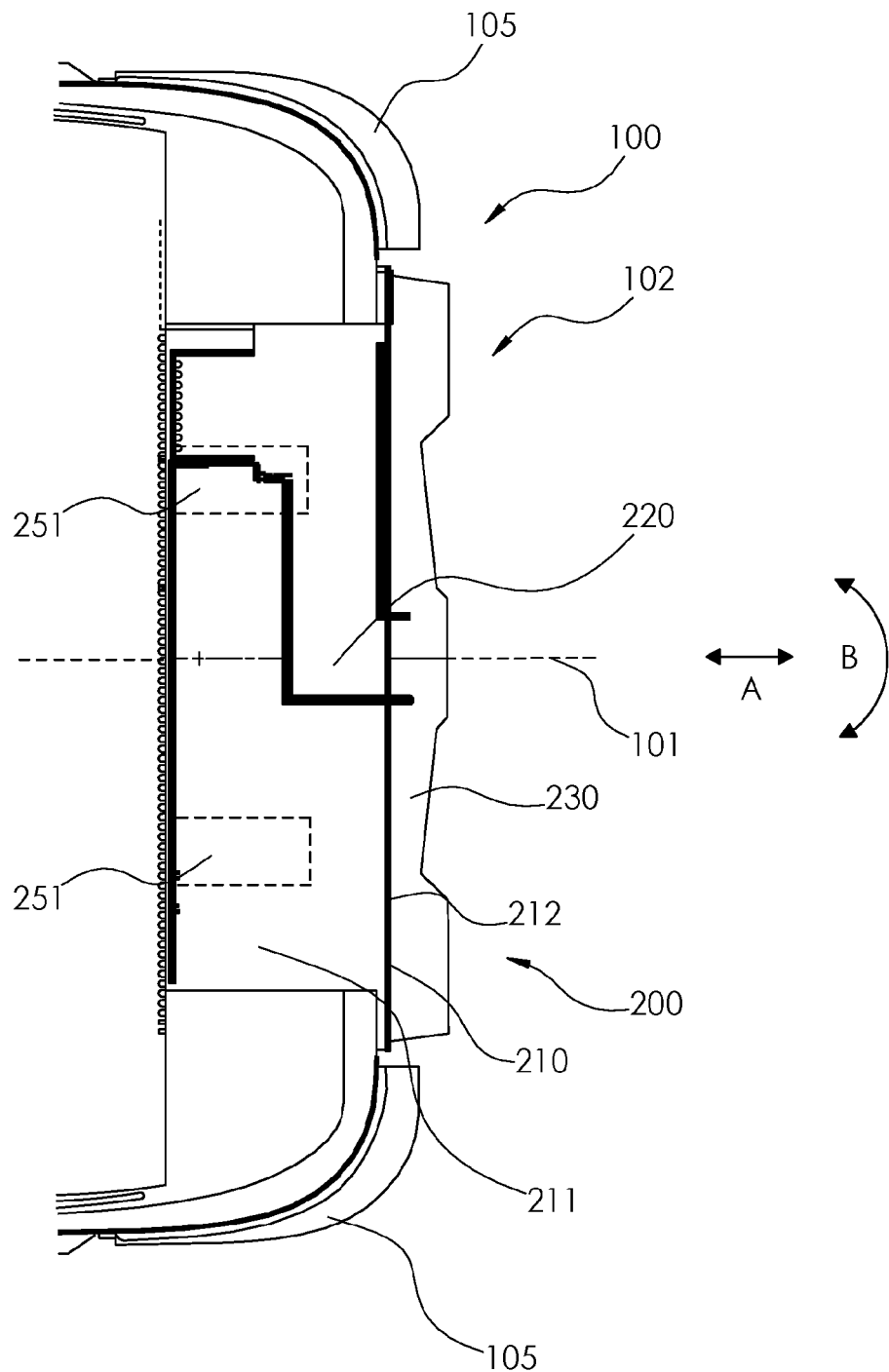
FIG. 1 is an overhead plan view of an end of an example waterborne vessel including an example cassette assembly.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

In overview, examples of the disclosure provide a cassette assembly attachable to an end portion of a waterborne vessel, comprising a movable cassette section to bear against an external structure and a resilient buffer system to counter movement of the cassette section, wherein the resilient buffer system comprises at least two buffers spaced apart across a width of the cassette section, each buffer comprising a plurality of resiliently compressible elements arranged in series. The arrangement of a plurality of resiliently compressible elements in series may allow the buffer system to absorb more energy, whilst not exerting any significant increase in impact reaction force.

Figure 2:
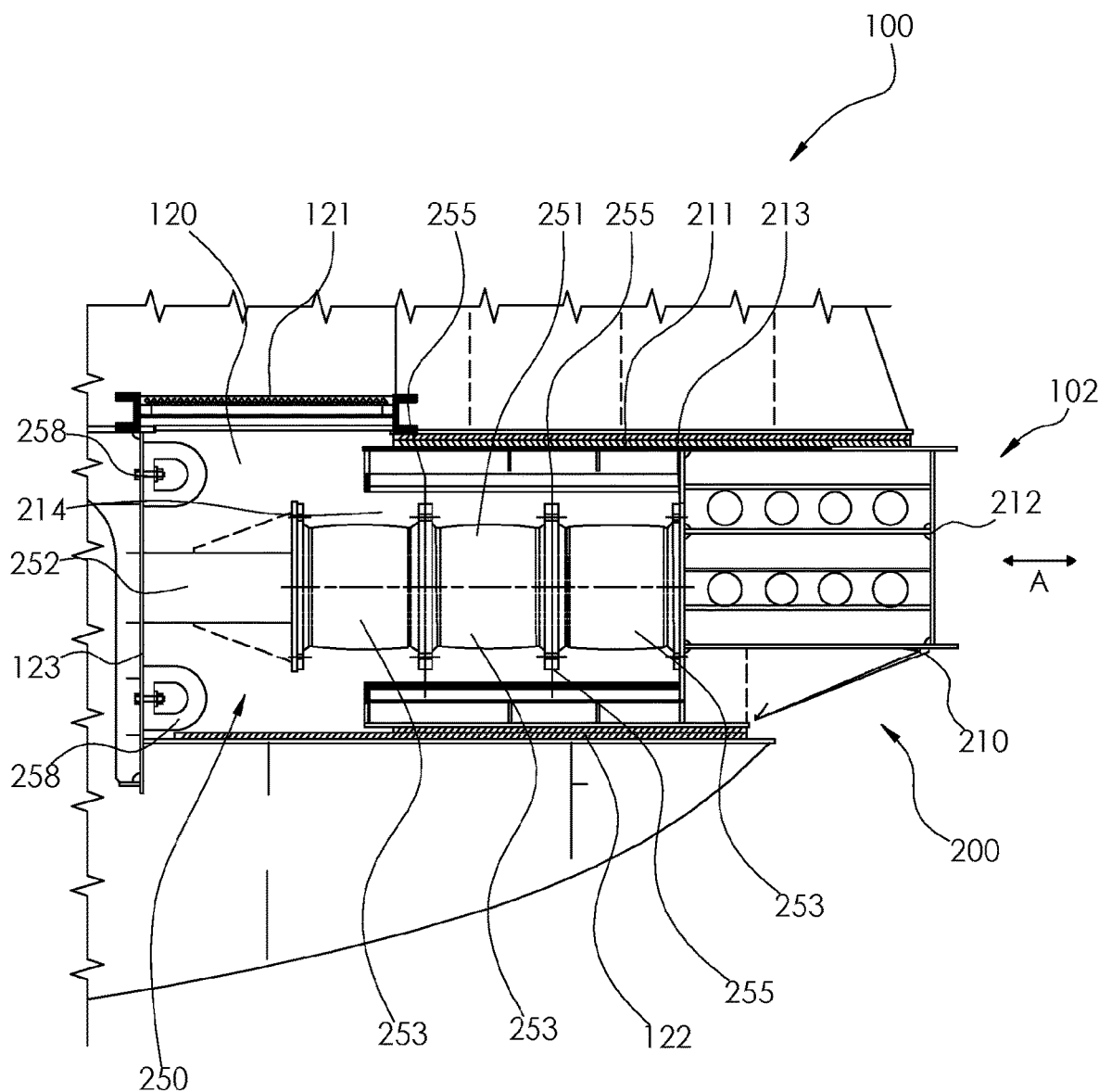
FIG. 2 is a side cross-section view of the end of the example waterborne vessel of FIG. 1.

FIGS. 1 and 2 show the forward portion 102 of an example waterborne vessel 100. The longitudinal centreline of the vessel 100 is indicated by reference numeral 101. The forward portion 102 extends in a horizontal or transverse direction, such that it is generally perpendicular to the centreline 101 when viewed in plan.

The vessel 100, particularly the forward portion 102, comprises a cassette assembly, generally indicated by reference number 200. As can be best seen in FIG. 2, the cassette assembly 200 is disposed in a receiving portion 120 formed in the structure of the vessel 100. For example, the receiving portion 120 takes the form of a recess extending in the transverse direction across the front portion 102, configured to receive the cassette assembly 200.

The receiving portion 120 is bound vertically by substantially horizontal deck plate of the vessel 100. For example, the receiving portion 120 is bound by overhanging bulwark structure 121 above the receiving portion 120 and the hull 122 of the vessel 100 below.

Similarly, the receiving portion 120 is bound horizontally by at its transverse ends by substantially vertical bulkheads. In one example, the vessel 100 is a twin-hull vessel. In such an example, the substantially vertical bulkheads may be arranged on the centreline of each demi-hull of the vessel 100. The rear of the recess 120 may be formed by a substantially vertical transverse bulkhead 123.

The cassette assembly 200 comprises a cassette section 210 or carriage. The cassette section 210 takes the form of a platform, slidably mounted in the receiving portion 120, so that it may move in the longitudinal direction indicated by arrow A. The cassette section 210 may also rotate in a horizontal plane, as indicated by arrow B. For example, the cassette section 210 may comprise arcuate sections at its transverse edges, supported by corresponding arcuate channels.

The upper surface 211 of the cassette section 210 allows users to access the water-accessible structure. For example, a walkway 220 may be formed on the upper surface 211, though it will be understood that in some examples the whole of the upper surface 211 may be walked upon.

A front portion 212 of the cassette section 210 is configured to contact the water-accessible structure. The front portion 212 (and therefore the receiving portion 120) may extend approximately 65-70% of the width of the forward portion 102. As shown in FIG. 1, the front portion 212 may comprise a fender section 230. The fender section 230 is formed of a flexible or resilient material which may compress on contact with the water-accessible structure, such as rubber. The shape of the fender section 230 will be discussed in more detail with reference to FIGS. 4 and 5 hereinbelow. In some examples, the vessel 100 may also comprise fender sections 105 disposed at either side of the cassette assembly.

The cassette assembly 200 also comprises a resilient buffer system 250. The resilient buffer system 250 is configured to counter movement of the cassette section 210 caused by contact between the cassette section 210 and the water-accessible structure. The resilient buffer system 250 comprises a pair of buffers 251. The buffers 251 are spaced apart across the width of the cassette section 210.

The buffers 251 extend from the rear bulkhead 123 of the receiving portion 120 to a stop surface 213 of the cassette section 210. The stop surface 213 may be a substantially vertical surface, forming the end of a guide channel 214 extending horizontally into the cassette section 210. The buffers 251 may be mounted to the rear bulkhead 123 by virtue of a mounting post 252 extending horizontally from the rear bulkhead, to which the buffers 251 may be secured.

Each buffer 251 comprises a plurality of resiliently compressible elements 253. The compressible elements 253 are arranged in series in the direction A. The compressible elements 253 are substantially tubular compressible members with facing plates disposed at either end of the tubular member. For example, the compressible elements 253 take the form of rubber fender cells or cones. The compressible elements 253 are capable of being compressed to absorb the energy of the contact between the cassette section 210 and the water-accessible structure. Once the compression force is removed, the compressible elements 253 are configured to experience a restoring force, thereby returning to their initial, substantially uncompressed state.

In the example shown, each buffer 251 comprises 3 resiliently compressible elements 253. In further examples, each buffer 251 may comprise 2, 4, 5, 6 or another number of resiliently compressible elements 251.

In one example, the compressible elements comprise cell fenders. In one example, each compressible element has a longitudinal length of approximately 500 mm. The diameter of the tubular portion of the compressible element may be approximately 550 mm. The diameter of the facing plates may be approximately 650 mm. The compressible element may have a maximum deflection or compression of approximately 52.5%. Compression of the compressible element may require approximately 26 kNm energy, and provide a reaction force of approximately 120 kN. This may be rated performance data in accordance with PIANC, with an initial high-speed berthing velocity of 0.15 m/s. For example, the performance may be at 23° C.+/−5° C., at a compression angle of 0°. In one example, the compressible elements are SCK Cell Fenders provided by Trelleborg Marine Systems, suitably SCK 500 E1.3 cell fenders.

Figure 3A:
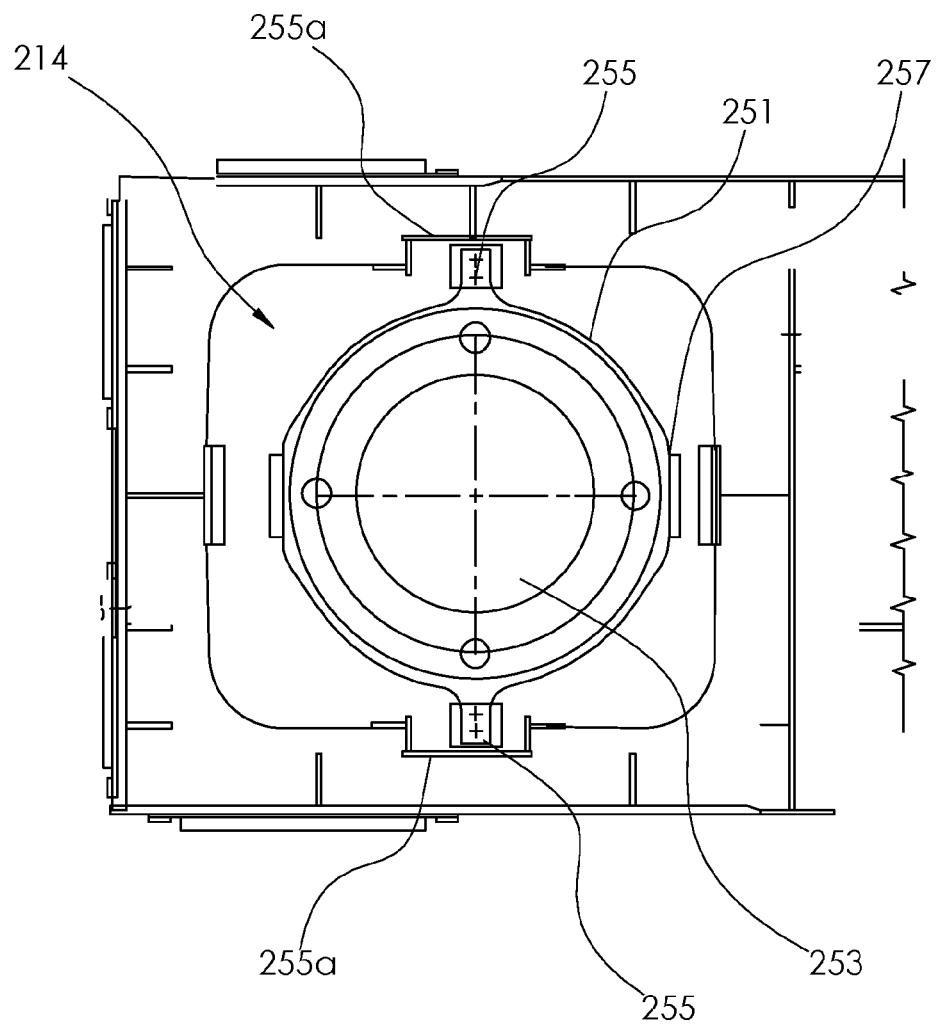
FIG. 3A is a front view of an example guide channel of the cassette.
Figure 3B:
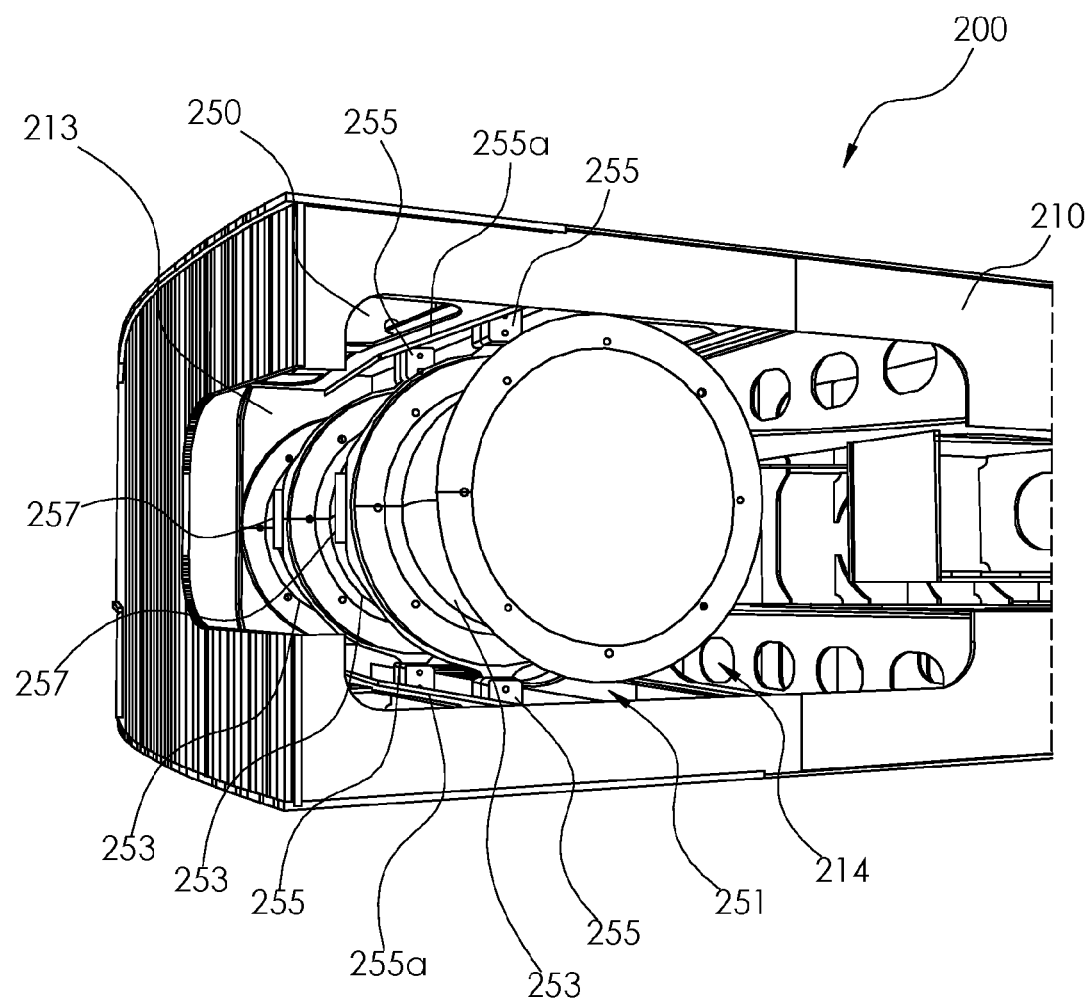
FIG. 3B is a partial cutaway perspective view of the guide channel of FIG. 3A.
Figure 3C:
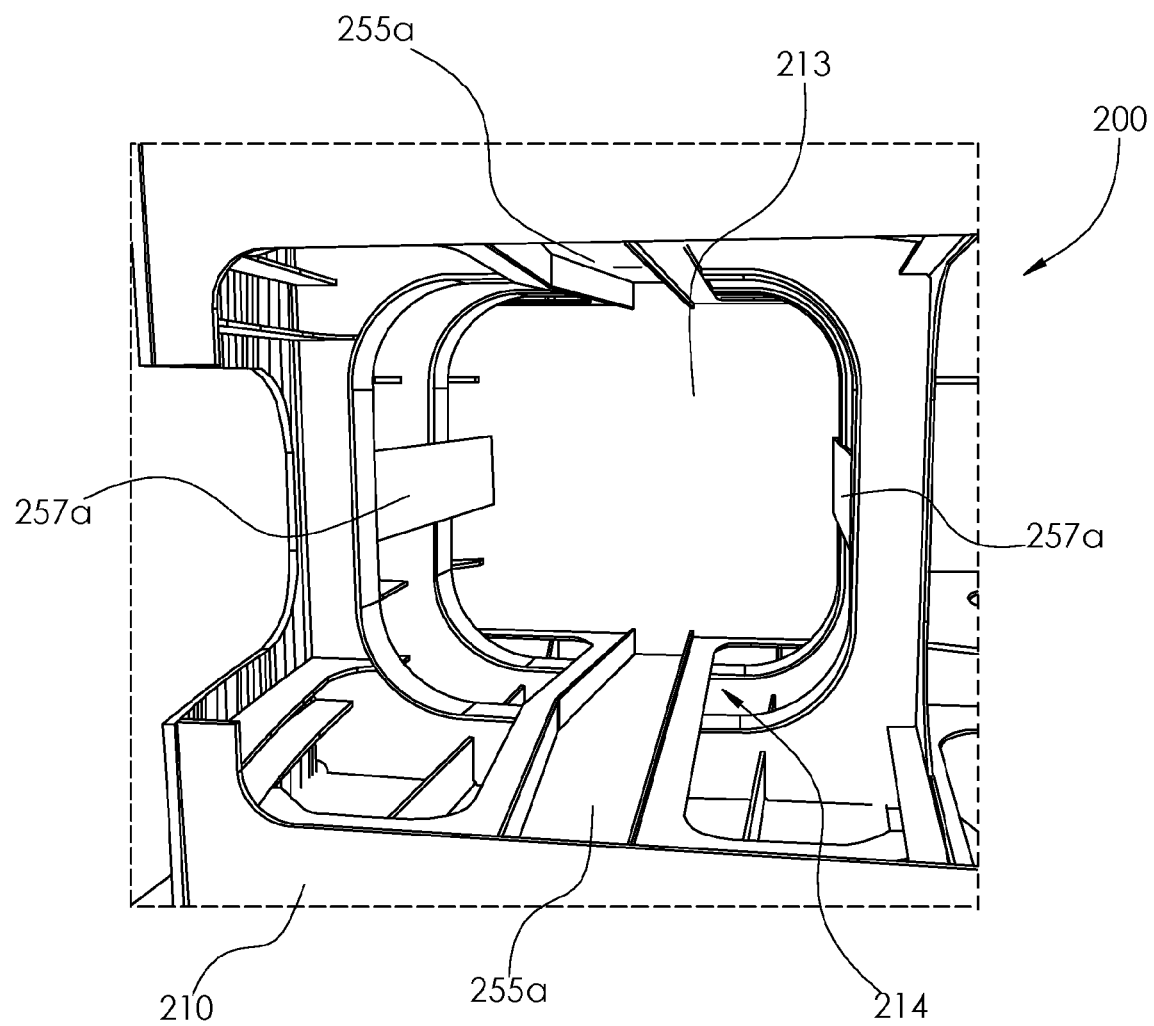
FIG. 3C is a partial cutaway perspective view of the guide channel of FIG. 3A-B with the buffer omitted.

Guide projections 255, which are shown in detail in FIG. 3A-C, are mounted between neighbouring compressible elements 253. The guide projections 255 project radially from the compressible elements 253, for example in a vertical plane above and below the compressible elements 253. The guide projections 255 are configured to interact with the guide channel 214, so as to control the movement of the buffer 251. For example, the guide projections 255 cooperate with corresponding slots 255a defined in the channel 214. The slots 255a may be sized to prevent the buffer 251 from moving vertically. Accordingly, the depth of each slot 255a may be substantially the same as the height of the projections 255. In one example, each projection 255 comprises a nylon shoe, so as to reduce friction between the projection 255 and the slot 255a. The guide projections 255 and corresponding slots 255a may form a first or vertical guide for the buffer 251, preventing motion in a vertical direction.

A second guide for the buffer 251 may limit the transverse range of motion of the buffer 251. For example, the transverse width of the channel 214 may provide the limit to the possible transverse motion of the buffer 251. In one example, buffer 251 and/or the channel 214 comprise low-friction elements that facilitate contact between the buffer 251 and the transverse edges of the channel. For example, the channel 214 may comprise nylon blocks 257a, which are arranged to be contacted by stainless steel blocks 257 formed on the transverse sides of the buffer, for example mounted between neighbouring compressible elements 253. The slot 255a may also have a width that is wider than the projections 255a, so as to permit transverse motion of the buffer 251. Accordingly, the second guide limits transverse movement of the buffer 251 in use, so as to prevent shearing, whilst still allowing longitudinal motion and enough transverse motion to permit horizontal rotation of the cassette section 210.

The resilient buffer system 250 furthermore comprises stop elements 258, configured to limit the motion of the cassette section 210 in the longitudinal direction A, towards the opposite end of the vessel from the forward portion 102. The stop elements 258 are disposed in the receiving portion 120, on rear bulkhead 123. For example, two stop elements 258 may be present for each buffer 251, respectively disposed above and below the mounting post 252. Accordingly, the stop elements 258 are configured to contact the cassette section 210 at regions above and below the channel 215214. The stop elements 258 are formed of a flexible or resilient material, which may deform upon contact. For example, the stop elements 258 may be rubber fender blocks.

The stop elements 258 ensure that, if the cassette section 210 is moved such that it would contact the rear bulkhead 123, the impact is cushioned so as to prevent damage to the cassette section 210 and/or vessel 100. In one example, the cassette assembly 200 is configured so that the cassette section 210 contacts the stop elements 258 before the buffer 251 reaches its maximum compression limit. Accordingly, damage to the buffer 251 is prevented and the life of the compressible elements 253 may be extended.

Figure 4:
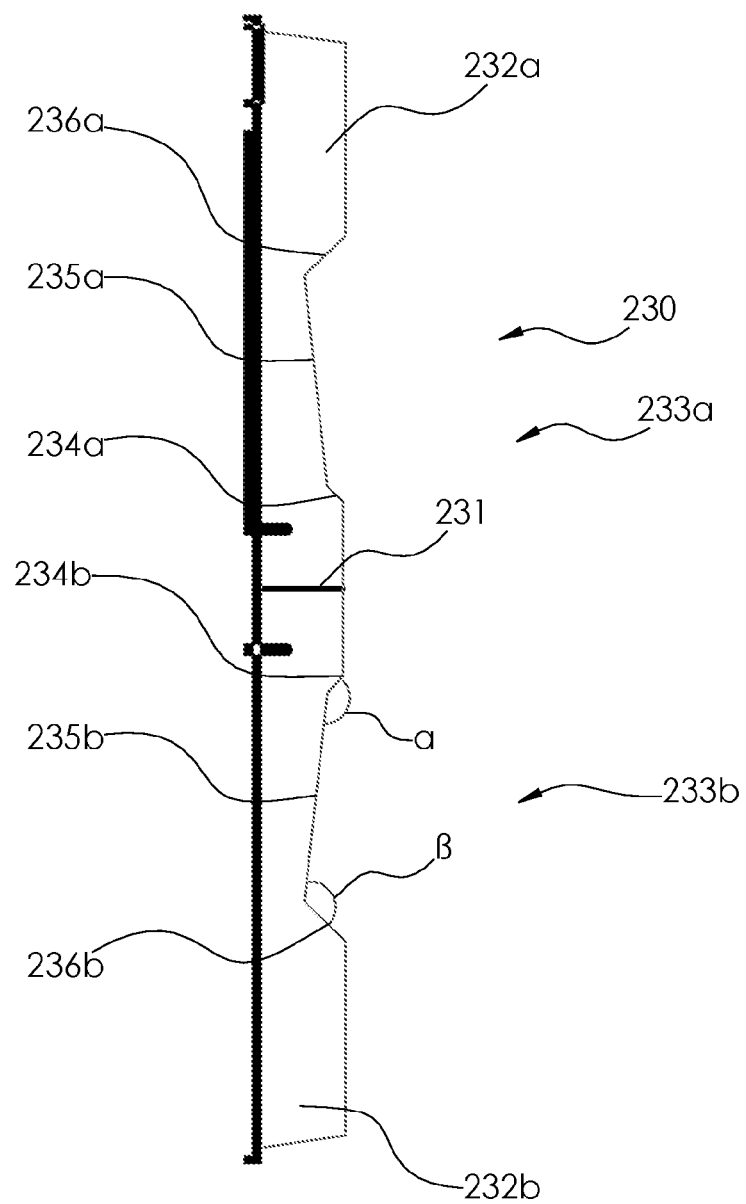
FIG. 4 is a plan view of an example fender section.

Turning now to FIG. 4, the shape of the fender section 230 will be discussed in more detail. The fender section 230 comprises a central protrusion 231, protruding longitudinally from substantially the transverse centre of the fender section 230. The fender section also comprises two transverse protrusions 232a and 232b, respectively arranged port and starboard of the central protrusion 231. Disposed between the central protrusion 231 and the transverse protrusions 232a,b are port and starboard recesses 233a,b.

Each recess 233a and 233b has a first sloping portion 234a and 234b, second sloping portion 235a and 235b and third sloping portion 236a and 236b, arranged consecutively extending away from the central protrusion 231 to its respective transverse protrusion 232. The first sloping portion 234 slopes longitudinally inward (i.e. away from the front portion 102) as it extends transversely away from the central protrusion 231, and the second sloping portion 235 also slopes longitudinally inward as it extends away from the central protrusion 231. The angle of slope of the second sloping portion 235 is shallower than the first sloping portion 234. The recess 233 further comprises a third sloping portion 236, which slopes longitudinally outward (i.e. towards the front portion 102) as it extends towards the transverse protrusion. The angle α between the first and second sloping portions 234, 235 is approximately 130 degrees. The angle β between the second and third sloping portions 235,236 is approximately 130 degrees.

Use of the vessel 100 and cassette assembly 200 will now be described with reference to FIGS. 5A-C, which additionally show a water-accessible structure 300.

For example, the water-accessible structure may be an offshore wind turbine 300. The offshore wind turbine 300 comprises an access structure 310 formed on one side thereof, which allows access to the turbine 300. The access structure 310 comprises a pair of spaced apart support tubes 311, and a ladder 312 disposed between the support tubes 311.

In use, the vessel approaches the turbine 300, and is navigated so that the fender section 230 of the cassette assembly 200 impacts the support tubes 311. Upon the fender section 230 contacting the support tubes 311, a reaction force is imparted to the cassette section 210. The reaction force causes the cassette section 210 to be urged in a rearward direction. The resilient buffer system 250 absorbs the shock of the impact by virtue of the compression of the buffers 251, thereby preventing damage to the vessel 100 and/or the turbine 300.

When the vessel 100 is in contact with the turbine 300, the vessel 100 may be maintained in position by applying a forward thrust (e.g. via a propeller or other motive arrangement of the vessel 100). Personnel wishing to access the turbine 300 may then step onto the walkway 220, and onto the ladder 312. Once any maintenance work has been completed and the personnel have returned to the vessel 100, the vessel 100 applies a reverse thrust, thereby moving away from the wind turbine 300. In doing so, the force which had compressed the buffers 251 is removed, and their resilient nature allows them to re-expand to the condition shown in FIG. 2.

Figure 5A:
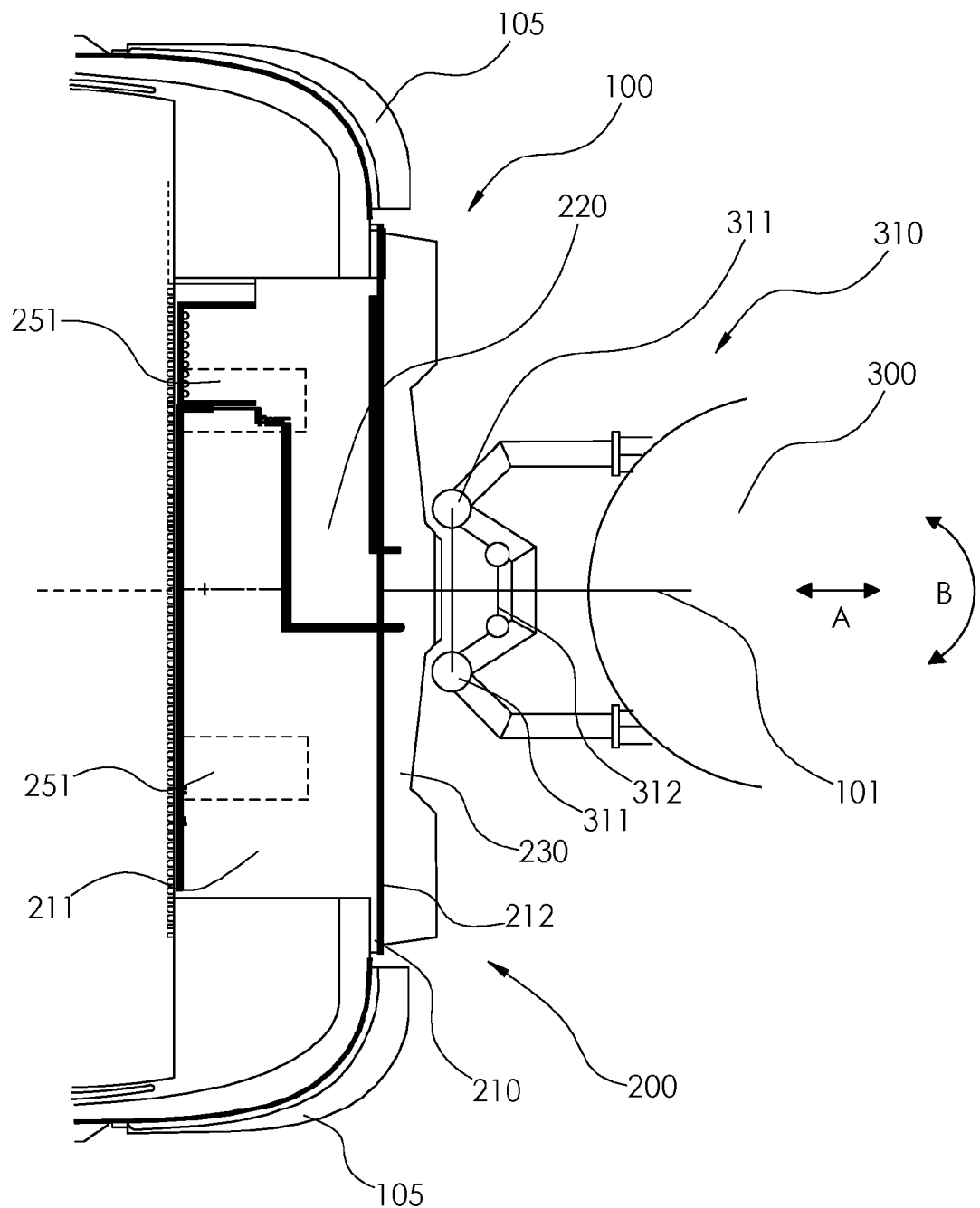
FIGS. 5A-C are overhead plan views of the example waterborne vessel of FIGS. 1 and 2 contacting a water-accessible structure.

In FIG. 5A, the vessel 100 is shown in aligned impact with the turbine 300, such that the longitudinal axis 101 of the vessel 100 is perpendicular to a notional line extending between the tubes 311. In this state, the central protrusion 231 is received in between the tubes 311, with the tubes 311 contacting the recesses 233a,b at either side of the central protrusion 231. This is the ideal situation, with the impact force substantially aligned to the direction of compression of the buffers 251. Furthermore, the location of the central protrusion 231 between the tubes 311 may assist in retaining the vessel 100 in location, for example in the event of wind or current acting on the vessel 100.

Figure 5B:
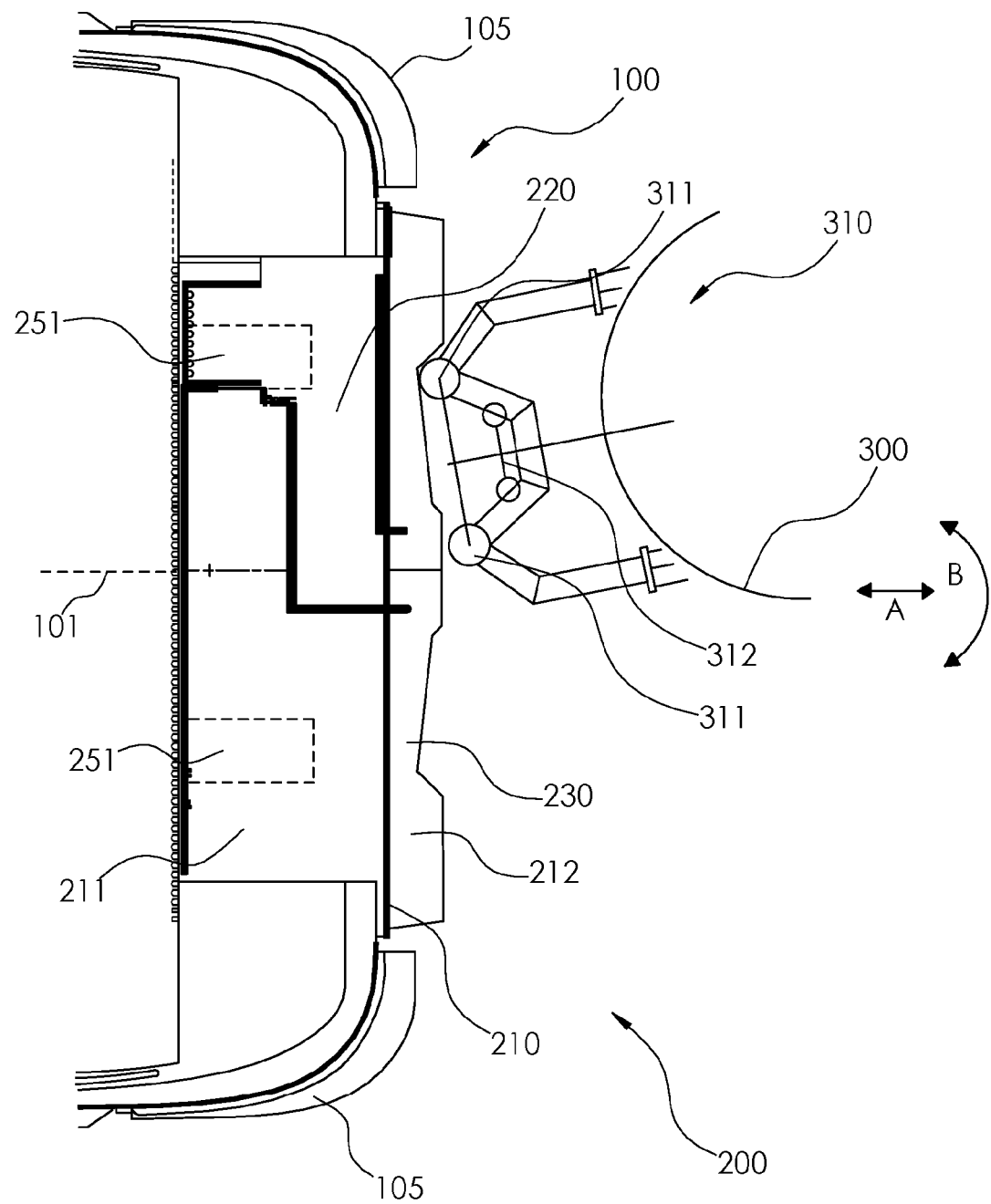

FIG. 5B shows initial contact between the vessel 100 and the turbine 300, with the vessel 100 approximately 10 degrees out of alignment with respect to the position shown in FIG. 5A. In this misaligned approach, a first tube of the support tubes 311 is engaged by the port recess 233a, and captured at the junction of the second sloping portion 235a and third sloping portion 236a. Accordingly, the second and third sloping portion 235,236 act as a stop surface, preventing further outboard motion of the first tube 311 with respect to the fender section 230.

Figure 5C:
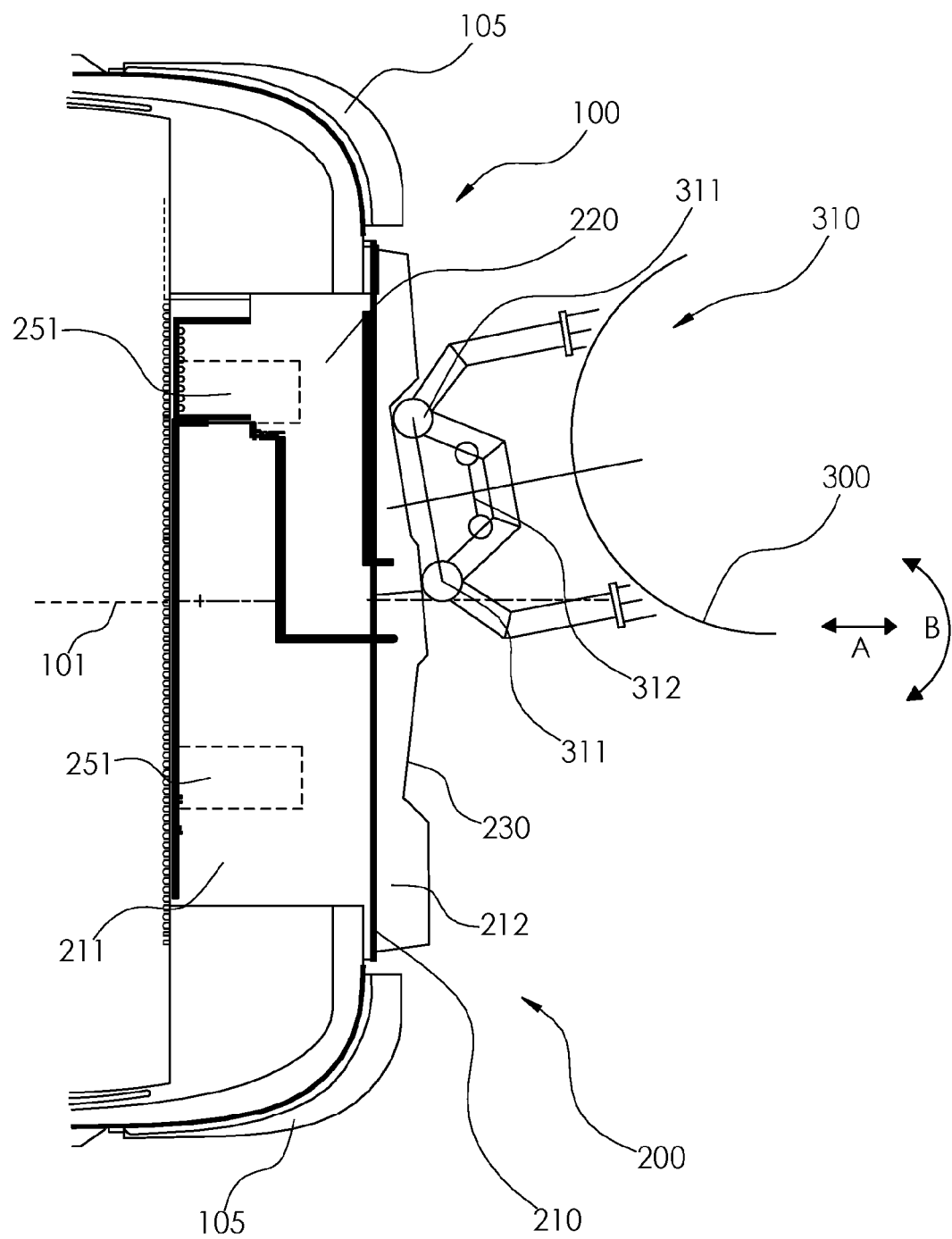

As can be seen in FIG. 5C, the impact causes the port side of the cassette section 210 to move inwardly, causing rotation of the cassette section 210 in the horizontal plane. This brings the central protrusion 231 into contact with the second tube of the support tubes 311. Accordingly, the shape of the fender section 230 ensures that both tubes are contacted, even in the event of a misaligned impact. This ensures the impact is shared between both tubes 311, to prevent damage thereto. It also assists in ensuring that both resilient buffers 251 absorb the impact.

Figure 6A:
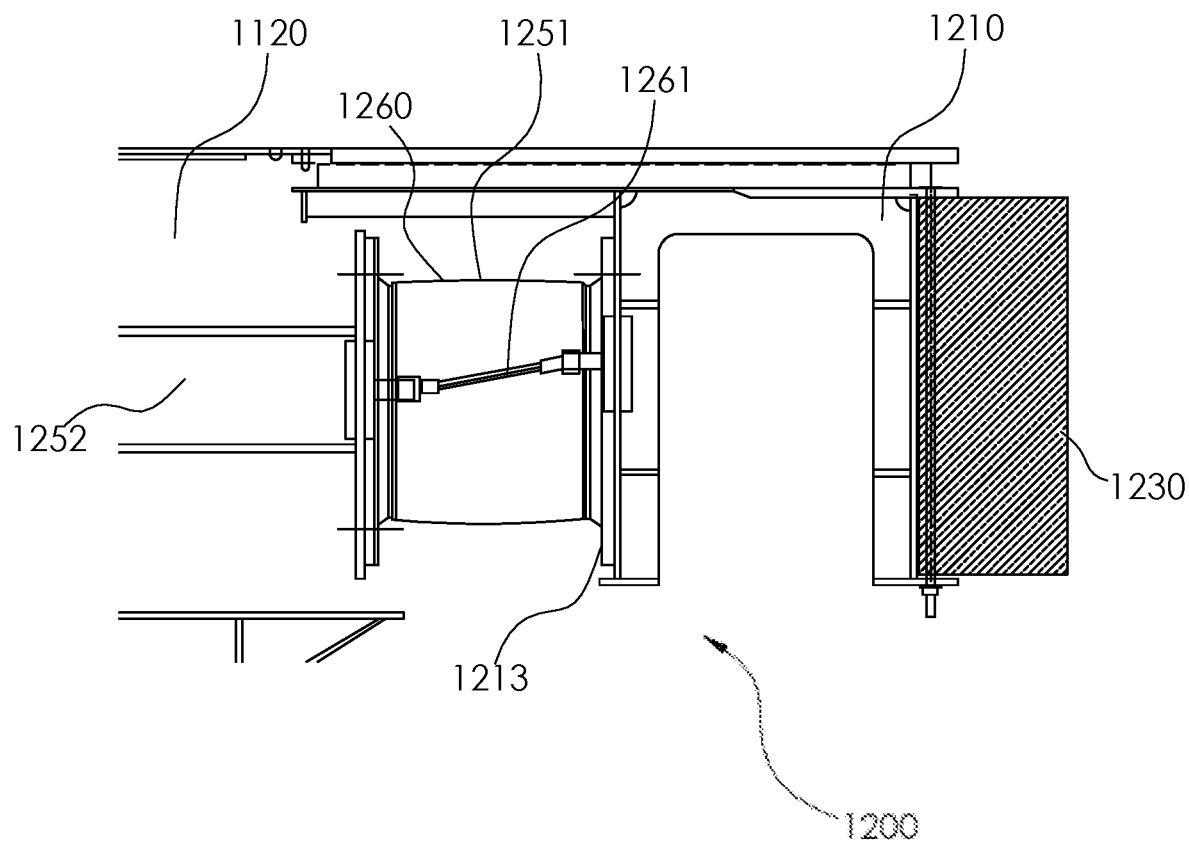
FIGS. 6A and 6B are side cross-section views of an example waterborne vessel.
Figure 6B:
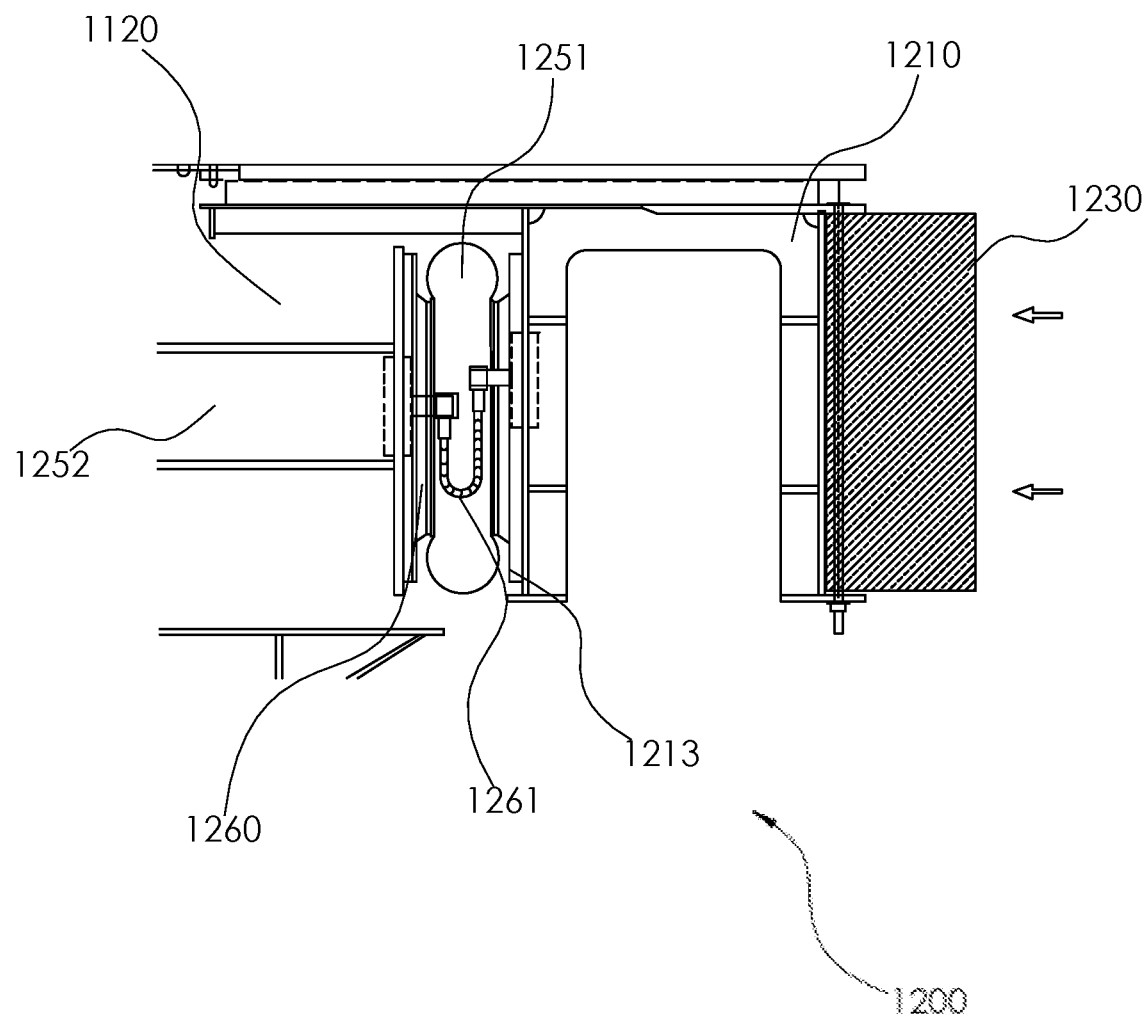

FIGS. 6A and 6B shows another example cassette assembly 1200. The cassette assembly 1200 is similar and structure and operation to the cassette assembly 200, with corresponding elements having corresponding reference numerals incremented by 1000.

The cassette assembly 1200 further includes an over rotation prevention unit 1260. The over rotation prevention unit 1260 comprises a plurality of restraining ties 1261, extending from the stop surface 1213 to the mounting post 1252. For example, there may be at least two restraining ties, disposed proximate the respective transverse ends of the stop surface 1213. The restraining ties 1261 are configured to reach tension as shown in FIG. 6A and prevent the stop surface 1213 from moving further than the length of the tie 1261 away from the mounting post 1252. The length of the tie 1261 is selected so that the stop surface 1213 cannot move to a position in which the resilient buffer 1251 is stretched beyond its uncompressed state. However, upon compression of the resilient buffer 1251, the tie 1261 reverts to a relaxed state. The over rotation prevention unit 1260 therefore is able to prevent a strong contact at one end of the cassette section 1210 causing an excessive rotation of the cassette section 210, thereby damaging the buffer 1251 the other end of the cassette section.

Although the resilient buffer 1251 of cassette assembly 1200 has only one resiliently compressible element 1253, it will be understood that the over rotation prevention unit 1260 may be incorporated into the cassette assembly 200.

It will be appreciated that, in some examples, the cassette assembly 200 or 1200 may be retrofitted to a vessel 100 having a suitable receiving portion. For example, the cassette assembly 200 or 1200 could be bolted or welded to the foredeck of the vessel, for example utilising the open space typically situated on the forward cargo deck of a vessel. Equally, the cassette assembly 200 or 1200 may be attachable to and detachable from the vessel 100, for example for servicing, repair and the like.

In some examples, the cassette assembly may comprise a buffer comprising a plurality of compressible elements arranged in series, and a buffer comprising a single compressible element. The disclosure extends to any combination of any number of buffers comprising single or multiple compressible elements.

Figure 7:
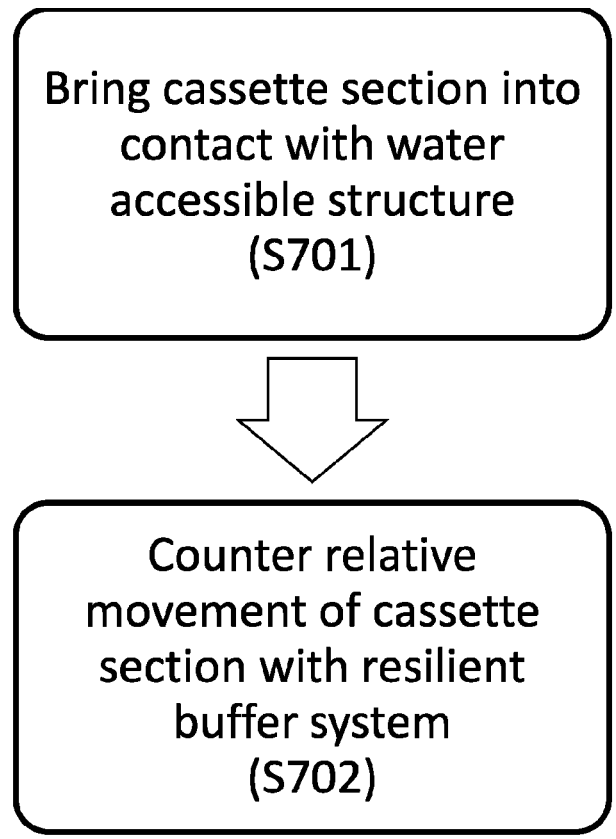
FIG. 7 is a flowchart of an example method of servicing a water-accessible structure.

FIG. 7 illustrates a method of servicing a water-accessible structure using a waterborne vessel comprising a cassette assembly arranged at an end portion of the waterborne vessel. In block S701, a cassette section of the cassette assembly is brought into contact with the water accessible structure. In block S702, relative movement of the cassette section in a direction towards an opposite end of the vessel is countered using a resilient buffer system.

Advantageously, the above-described examples provide an improved vessel for accessing structures in water. The use of buffers comprising a plurality of resilient elements arranged in series provides a system able to absorb more energy whilst not exerting a significant increase in impact reaction force. Accordingly, vessels having a greater mass may be used to service water-accessible structures, and a larger tolerance of impact velocities may be permitted. Furthermore, the above-described examples provide a vessel which is able to approach the structure from a wider range of angles without causing damage to either the vessel or the structure, thereby easing operation of the vessel.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A cassette assembly attachable to an end portion of a waterborne vessel, the cassette assembly comprising:
a cassette section to bear against an external structure in use, the cassette section movable relative to the vessel in a direction towards an opposite end of the vessel; and
a resilient buffer system to counter movement of the cassette section when the vessel is moved towards the external structure,
wherein the resilient buffer system comprises a buffer comprising a plurality of resiliently compressible elements arranged in series, and
wherein the resilient buffer system comprises a vertical guide to prevent vertical movement of the buffer,
wherein the vertical guide comprises a guide projection formed on one of the buffer or a guide channel of the cassette section, configured to cooperate with a slot formed on the other of the buffer or the guide channel.

2. The cassette assembly of claim 1, wherein the cassette section is rotatable in a horizontal plane.

3. The cassette assembly of claim 1, wherein the cassette section comprises a walkway formed on an upper surface thereof.

4. The cassette assembly of claim 1, comprising at least two buffers spaced apart across a width of the cassette section.

5. The cassette assembly of claim 1, wherein the cassette section comprises a fender section configured to contact the external structure, the fender section comprising:
a central protrusion, and
a pair of recesses positioned at respective transverse sides of the central protrusion,
wherein the recesses comprise a stop surface, to prevent outboard motion of a first support tube of the external structure beyond the stop surface,
wherein the recesses and central protrusion are configured so that contact between the first support tube and the stop surface causes rotation of the cassette section such that the central protrusion contacts a second support tube of the external structure.

6. The cassette assembly of claim 1, wherein each buffer comprises three compressible elements arranged in series.

7. The cassette assembly of claim 1, wherein the resilient buffer system comprises stop elements configured to limit the motion of the cassette section towards the opposite end of the vessel.

8. The cassette assembly of claim 7, wherein the cassette section is configured to contact the stop elements before the buffers reach a maximum compression limit.

9. The cassette assembly of claim 1, comprising an over rotation prevention unit.

10. A waterborne vessel comprising a receiving portion, the receiving portion configured to receive a cassette assembly of claim 1.

11. The waterborne vessel of claim 10, wherein the receiving portion comprises a recess in the vessel.

12. The waterborne vessel of claim 10, comprising a cassette assembly disposed in the receiving portion.

13. A method of servicing a water-accessible structure using a waterborne vessel, the waterborne vessel comprising a cassette assembly arranged at an end portion of the waterborne vessel, the method comprising:
   bringing a cassette section of the cassette assembly into contact with the water accessible structure, and
   countering relative movement of the cassette section in a direction towards an opposite end of the vessel using a resilient buffer system,
   wherein the resilient buffer system comprises a buffer comprising a plurality of resiliently compressible elements arranged in series,
   wherein the resilient buffer system comprises a vertical guide to prevent vertical movement of the buffer,
   wherein the vertical guide comprises a guide projection formed on one of the buffer or a guide channel of the cassette section, configured to cooperate with a slot formed on the other of the buffer or the guide channel.

14. The method of claim 13, wherein the water-accessible structure is a wind turbine.

15. A cassette assembly attachable to an end portion of a waterborne vessel, the cassette assembly comprising:
   a cassette section to bear against an external structure in use, the cassette section movable relative to the vessel in a direction towards an opposite end of the vessel; and
   a resilient buffer system to counter movement of the cassette section when the vessel is moved towards the external structure,
   wherein the resilient buffer system comprises a buffer comprising a plurality of resiliently compressible elements arranged in series,
   wherein the resilient buffer system comprises a transverse guide to limit a range of transverse movement of the buffer,
   wherein the transverse guide comprises first contact elements formed on transverse edges of the buffer, the first contact elements configured to contact second contact elements formed on transverse edges of a guide channel of the cassette section.

* * * * *